United States Patent
Kurosumi

(10) Patent No.: US 10,599,123 B2
(45) Date of Patent: Mar. 24, 2020

(54) MACHINE TOOL WITH FUNCTION TO AUTOMATICALLY MODIFY CUTTING CONDITIONS

(71) Applicant: FANUC Corporation, Yamanashi (JP)

(72) Inventor: Yasuhiko Kurosumi, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 337 days.

(21) Appl. No.: 15/009,214

(22) Filed: Jan. 28, 2016

(65) Prior Publication Data

US 2016/0224004 A1    Aug. 4, 2016

(30) Foreign Application Priority Data

Jan. 29, 2015   (JP) ................................. 2015-015024

(51) Int. Cl.
  *G05B 19/18* (2006.01)
  *G05B 19/4093* (2006.01)

(52) U.S. Cl.
  CPC ...... *G05B 19/182* (2013.01); *G05B 19/40937* (2013.01); *G05B 2219/31407* (2013.01); *G05B 2219/36086* (2013.01)

(58) Field of Classification Search
  CPC ........ G05B 19/182; G05B 2219/31407; G05B 2219/36086; G05B 19/40937
  See application file for complete search history.

(56) References Cited

U.S. PATENT DOCUMENTS 4,509,126 A * 4/1985 Olig ................... G05B 19/4163
                                                              318/561
4,547,847 A * 10/1985 Olig ................... G05B 19/4163
                                                              318/561
(Continued)

FOREIGN PATENT DOCUMENTS

CN   102331749 A   1/2012
CN   103076757 A   5/2013
(Continued)

OTHER PUBLICATIONS

Office Action in JP Application No. 2015-015024, dated Sep. 13, 2016.

(Continued)

*Primary Examiner* — Jennifer L Norton
(74) *Attorney, Agent, or Firm* — Hauptman Ham, LLP

(57) ABSTRACT

The machine tool according to the present invention has: a function to set upper limits and lower limits for cutting conditions including a cutting width, a cutting depth, and a cutting load of a tool; a function to set a range and a modification condition of the machining program modifying the cutting width or the cutting depth of the tool; a function to modify, based on the modification condition, a movement amount of a block that orders a feeding operation of the machining program; a function to calculate a load imposed upon cutting, based on a cutting condition obtained prior to modification of the machining program and a variation in the modified movement amount; and a function to determine whether or not the calculated load and the modified movement amount fall within the set ranges between the upper limits and the lower limits of the cutting width or cutting depth and the cutting load.

6 Claims, 13 Drawing Sheets

| STEP NUMBERS | DETAILS | PERSON WHO EXECUTES THE STEP |
|---|---|---|
| STEP 1 | CONSIDER WHETHER TO MODIFY CUTTING CONDITIONS | OPERATOR OR PRODUCTION LINE MANAGER |
| STEP 2 | ENTER UPPER LIMITS AND LOWER LIMITS OF CUTTING CONDITIONS OF EACH TOOL | OPERATOR OR PRODUCTION LINE MANAGER |
| STEP 3 | SET CONDITIONS FOR AUTOMATICALLY MODIFYING CUTTING CONDITIONS | OPERATOR OR PRODUCTION LINE MANAGER |
| STEP 4 | ACTIVATE MACHINING PROGRAM | OPERATOR, PRODUCTION LINE MANAGER, OR DEVICE OUTSIDE MACHINE TOOL |
| STEP 5 | APPLY MODIFICATIONS OF CUTTING CONDITIONS TO MACHINING PROGRAM BEING EXECUTED, IN ACCORDANCE WITH SETTINGS (INCLUDING PROCESS FOR DETERMINING WHETHER MODIFIED CUTTING CONDITIONS ARE INCLUDED IN SET CONDITIONS) | MACHINE TOOL (EXECUTED AUTOMATICALLY) |
| STEP 6 | STOP MACHINING PROGRAM | MACHINE TOOL (EXECUTED AUTOMATICALLY) |

(56) References Cited

U.S. PATENT DOCUMENTS

| | | | | |
|---|---|---|---|---|
| 4,759,243 A * | 7/1988 | Thompson | ............. | B23Q 15/12 |
| | | | | 82/1.11 |
| 4,823,253 A * | 4/1989 | Shima | ............. | G05B 19/40937 |
| | | | | 700/159 |
| 5,115,400 A * | 5/1992 | Watanabe | ............. | G05B 19/4097 |
| | | | | 700/182 |
| 5,815,400 A * | 9/1998 | Hirai | ............. | G05B 19/401 |
| | | | | 700/173 |
| 5,831,407 A | 11/1998 | Ouchi et al. | | |
| 5,876,155 A * | 3/1999 | Link | ............. | B23C 3/051 |
| | | | | 408/1 R |
| 6,107,768 A | 8/2000 | Ouchi et al. | | |
| 6,535,788 B1 | 3/2003 | Yoshida et al. | | |
| 6,885,984 B1 | 4/2005 | Suzuki et al. | | |
| 9,665,085 B2 * | 5/2017 | Kawashima | ..... | G05B 19/40937 |
| 9,989,957 B2 * | 6/2018 | Kurosumi | ..... | G05B 19/4065 |
| 2001/0027354 A1 * | 10/2001 | Kakino | ............. | G05B 19/4163 |
| | | | | 700/173 |
| 2003/0163286 A1 * | 8/2003 | Yasugi | ............. | G05B 19/4065 |
| | | | | 702/185 |
| 2004/0167659 A1 * | 8/2004 | Scherer | ............. | G05B 19/4163 |
| | | | | 700/173 |
| 2004/0186614 A1 | 9/2004 | Yamaguchi et al. | | |
| 2004/0210337 A1 * | 10/2004 | Ikeda | ............. | G05B 19/40937 |
| | | | | 700/160 |
| 2006/0079987 A1 * | 4/2006 | Cha | ............. | G05B 19/4097 |
| | | | | 700/173 |
| 2010/0063603 A1 * | 3/2010 | Chandhoke | ...... | G05B 19/40937 |
| | | | | 700/34 |
| 2010/0211208 A1 * | 8/2010 | Chiu | ............. | B26D 5/00 |
| | | | | 700/169 |
| 2013/0345853 A1 * | 12/2013 | Berman | ............. | G05B 19/4093 |
| | | | | 700/187 |
| 2014/0288692 A1 | 9/2014 | Kawashima | | |
| 2016/0048616 A1 * | 2/2016 | Nagata | ............. | G06F 17/5009 |
| | | | | 703/7 |
| 2016/0147212 A1 * | 5/2016 | Kurosumi | .......... | G05B 19/4065 |
| | | | | 700/160 |
| 2017/0139403 A1 * | 5/2017 | Saitou | ............. | G05B 19/406 |
| 2017/0220025 A1 * | 8/2017 | Kawai | ............. | G05B 19/409 |
| 2017/0227945 A1 * | 8/2017 | Wang | ............. | G05B 19/182 |
| 2017/0259357 A1 * | 9/2017 | Choi | ............. | B23D 21/00 |
| 2019/0079489 A1 * | 3/2019 | Natsuhara | .......... | G05B 19/4069 |

FOREIGN PATENT DOCUMENTS

| | | | | |
|---|---|---|---|---|
| CN | 103926872 A | 7/2014 | | |
| CN | 104062941 A | 9/2014 | | |
| EP | 3432100 A1 * | 1/2019 | ......... | G05B 19/4063 |
| JP | 62-208856 A | 9/1987 | | |
| JP | 7-295619 A | 11/1995 | | |
| JP | 9-38843 A | 2/1997 | | |
| JP | 11-277371 A | 10/1999 | | |
| JP | 2000-84794 A | 3/2000 | | |
| JP | 2002-116807 A | 4/2002 | | |
| JP | 2004-284002 A | 10/2004 | | |
| JP | 2007-094458 A | 4/2007 | | |
| JP | 2012-96301 A | 5/2012 | | |
| JP | 2014-221510 A | 11/2014 | | |
| WO | WO-2017142470 A1 * | 8/2017 | ............. | B23K 15/00 |

OTHER PUBLICATIONS

Office Action in CN Application No. 201610063838.4, dated May 3, 2018, 12pp.

* cited by examiner

FIG.1

| STEP NUMBERS | DETAILS | PERSON WHO EXECUTES THE STEP |
|---|---|---|
| STEP 1 | CONSIDER WHETHER TO MODIFY CUTTING CONDITIONS | OPERATOR OR PRODUCTION LINE MANAGER |
| STEP 2 | ENTER UPPER LIMITS AND LOWER LIMITS OF CUTTING CONDITIONS OF EACH TOOL | OPERATOR OR PRODUCTION LINE MANAGER |
| STEP 3 | SET CONDITIONS FOR AUTOMATICALLY MODIFYING CUTTING CONDITIONS | OPERATOR OR PRODUCTION LINE MANAGER |
| STEP 4 | ACTIVATE MACHINING PROGRAM | OPERATOR, PRODUCTION LINE MANAGER, OR DEVICE OUTSIDE MACHINE TOOL |
| STEP 5 | APPLY MODIFICATIONS OF CUTTING CONDITIONS TO MACHINING PROGRAM BEING EXECUTED, IN ACCORDANCE WITH SETTINGS (INCLUDING PROCESS FOR DETERMINING WHETHER MODIFIED CUTTING CONDITIONS ARE INCLUDED IN SET CONDITIONS) | MACHINE TOOL (EXECUTED AUTOMATICALLY) |
| STEP 6 | STOP MACHINING PROGRAM | MACHINE TOOL (EXECUTED AUTOMATICALLY) |

| TOOL NO. | CUTTING CONDITION | UPPER LIMIT | LOWER LIMIT |
|---|---|---|---|
| T1 | CUTTING WIDTH | 9 mm | 6 mm |
| | CUTTING DEPTH | 8 mm | 5.5 mm |
| | CUTTING LOAD | 120% | 80% |
| T2 | CUTTING WIDTH | 8 mm | 5 mm |
| | CUTTING DEPTH | 6 mm | 3.5 mm |
| | CUTTING LOAD | 150% | 90% |
| ... | ... | ... | ... |

FIG.3

| SETTING ITEMS | | SETTINGS | REMARKS |
|---|---|---|---|
| CUTTING CONDITION AUTOMATIC MODIFICATION FUNCTION, SETTINGS FOR CONDITION 1 | APPLICATION RANGE SETTING | 1) APPLY TO ENTIRE MACHINING PROGRAM<br>2) APPLY ONLY TO DESIGNATED RANGE OF MACHINING PROGRAM<br>3) NOT APPLYING | SELECT FROM 1) TO 3) |
| | CUTTING WIDTH | 1) NOT MODIFIED<br>2) INCREASED BY ○%<br>3) REDUCED BY □% | SELECT FROM 1) TO 3) + WHEN 2) OR 3) IS SELECTED, ENTER VALUES FOR ○ AND □ |
| | CUTTING DEPTH | 1) NOT MODIFIED<br>2) INCREASED BY ○%<br>3) REDUCED BY □% | |
| CUTTING CONDITION AUTOMATIC MODIFICATION FUNCTION, SETTINGS FOR CONDITION 2 | APPLICATION RANGE SETTING | 1) APPLY TO ENTIRE MACHINING PROGRAM<br>2) APPLY ONLY TO DESIGNATED RANGE OF MACHINING PROGRAM<br>3) NOT APPLYING | SELECT FROM 1) TO 3) |
| | CUTTING WIDTH | 1) NOT MODIFIED<br>2) INCREASED BY ○%<br>3) REDUCED BY □% | SELECT FROM 1) TO 3) + WHEN 2) OR 3) IS SELECTED, ENTER VALUES FOR ○ AND □ |
| | CUTTING DEPTH | 1) NOT MODIFIED<br>2) INCREASED BY ○%<br>3) REDUCED BY □% | |
| ... | ... | ... | ... |

FIG.4

| SETTING ITEMS | | SETTINGS | REMARKS |
|---|---|---|---|
| CUTTING CONDITION AUTOMATIC MODIFICATION FUNCTION, SETTINGS FOR CONDITION 1 | APPLICATION RANGE SETTING | 1) APPLY TO ENTIRE MACHINING PROGRAM<br>2) APPLY ONLY TO DESIGNATED RANGE OF MACHINING PROGRAM<br>3) NOT APPLYING | SELECT FROM 1) TO 3) |
| | CUTTING WIDTH | 1) NOT MODIFIED<br>2) INCREASED BY ○ MM<br>3) REDUCED BY □ MM | SELECT FROM 1) TO 3) + WHEN 2) OR 3) IS SELECTED, ENTER VALUES FOR ○ AND □ |
| | CUTTING DEPTH | 1) NOT MODIFIED<br>2) INCREASED BY ○ MM<br>3) REDUCED BY □ MM | |
| CUTTING CONDITION AUTOMATIC MODIFICATION FUNCTION, SETTINGS FOR CONDITION 2 | APPLICATION RANGE SETTING | 1) APPLY TO ENTIRE MACHINING PROGRAM<br>2) APPLY ONLY TO DESIGNATED RANGE OF MACHINING PROGRAM<br>3) NOT APPLYING | SELECT FROM 1) TO 3) |
| | CUTTING WIDTH | 1) NOT MODIFIED<br>2) INCREASED BY ○ MM<br>3) REDUCED BY □ MM | SELECT FROM 1) TO 3) + WHEN 2) OR 3) IS SELECTED, ENTER VALUES FOR ○ AND □ |
| | CUTTING DEPTH | 1) NOT MODIFIED<br>2) INCREASED BY ○ MM<br>3) REDUCED BY □ MM | |
| ... | ... | ... | ... |

FIG.5

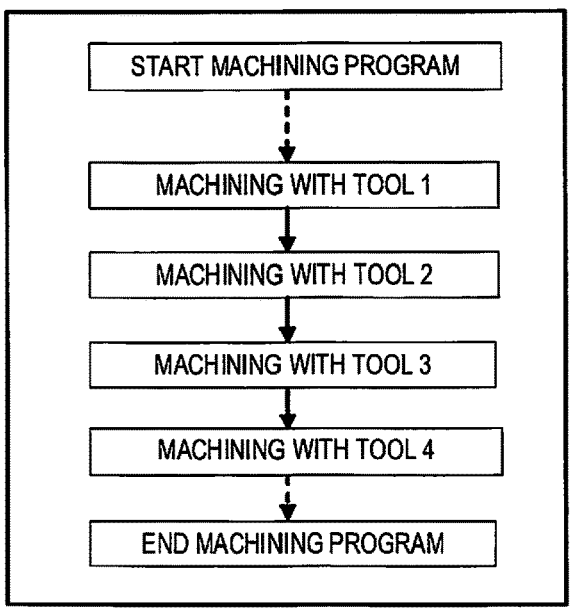

EXAMPLE IN WHICH AUTOMATIC MODIFICATION OF CUTTING CONDITIONS IS NOT PERFORMED ON ENTIRE MACHINING PROGRAM

EXAMPLE IN WHICH AUTOMATIC MODIFICATION OF CUTTING CONDITIONS IS PERFORMED ON ENTIRE MACHINING PROGRAM

EXAMPLE IN WHICH AUTOMATIC MODIFICATION OF CUTTING CONDITIONS IS PERFORMED ONLY ON DESIGNATED RANGE OF MACHINING PROGRAM

EXAMPLE 1 IN WHICH AUTOMATIC MODIFICATION OF CUTTING CONDITIONS IS PERFORMED ONLY ON DESIGNATED RANGE OF MACHINING PROGRAM 1

EXAMPLE 2 IN WHICH AUTOMATIC MODIFICATION OF CUTTING CONDITIONS IS PERFORMED ONLY ON DESIGNATED RANGE OF MACHINING PROGRAM 2

FIG.11

| STEPS | EXECUTED ITEMS | DETAILS OF EXECUTION |
|---|---|---|
| 1 | SEARCH FOR POSITION TO EXECUTE MILLING OR END MILLING | IN MACHINING PROGRAM, SEARCH FOR AND EXTRACT POSITION WHERE CUTTING FEED IN DIRECTION PERPENDICULAR TO ROTATION AXIS OF TOOL IS INSTRUCTED |
| 2 | ESTIMATE CUTTING DEPTH FOR MILLING OR END MILLING 1 | IN MACHINING PROGRAM, SEARCH FOR AND EXTRACT POSITION WHERE FAST-FORWARDING TOOL TOWARD WORKPIECE IN DIRECTION OF ROTATION AXIS OF TOOL IS INSTRUCTED, POSITION BEING LOCATED IMMEDIATELY BEFORE POSITION SEARCHED FOR AND EXTRACTED IN STEP 1 |
| 3 | ESTIMATE CUTTING DEPTH FOR MILLING OR END MILLING 2 | IN MACHINING PROGRAM, FIND WHETHER STEP 1 AND STEP 2 ARE REPEATEDLY EXECUTED OR NOT<br>a) IF REPEATEDLY EXECUTED… CALCULATE TOTAL MOVEMENT AMOUNT OBTAINED IN STEP 2<br>b) IF EXECUTED ONLY ONCE… MOVEMENT AMOUNT OBTAINED IN STEP 2 = CUTTING DEPTH |
| 4 | MODIFY CUTTING DEPTH FOR MILLING OR END MILLING | REDUCE MOVEMENT AMOUNT OBTAINED IN STEP 2, AND THEN REPEATEDLY EXECUTE STEP 1 AS MANY EXTRA TIMES AS NECESSARY. LAST OPERATION IS EXECUTED WITH MOVEMENT AMOUNT THAT IS CONSISTENT WITH TOTAL MOVEMENT AMOUNT IN STEP 2 AND DOES NOT EXCEED RANGE BETWEEN UPPER LIMIT AND LOWER LIMIT OF CUTTING DEPTH |

FIG.12

| STEPS | EXECUTED ITEMS | DETAILS OF EXECUTION |
|---|---|---|
| 1 | SEARCH FOR POSITION TO EXECUTE MILLING OR END MILLING | |
| 2 | ESTIMATE CUTTING DEPTH FOR MILLING OR END MILLING 1 | |
| 3 | ESTIMATE CUTTING DEPTH FOR MILLING OR END MILLING 2 | SAME AS STEPS 1 TO 3 OF FIG. 11 |
| 4 | MODIFY CUTTING DEPTH FOR MILLING OR END MILLING | a) IF REPEATEDLY EXECUTED... INCREASE MOVEMENT AMOUNT IN STEP 2 (= MOVEMENT AMOUNT OF CUTTING DEPTH 2) AND REDUCE THE NUMBER OF TIMES TO EXECUTE STEP 1 AS MUCH AS NECESSARY, THEREBY REPEATEDLY EXECUTING THIS MODIFICATIONS. LAST OPERATION IS EXECUTED WITH MOVEMENT AMOUNT THAT IS CONSISTENT WITH TOTAL MOVEMENT AMOUNT IN STEP 2 AND DOES NOT EXCEED RANGE BETWEEN UPPER LIMIT AND LOWER LIMIT OF CUTTING DEPT b) IF EXECUTED ONLY ONCE... DISCONTINUE APPLICATION OF MODIFICATION OF CUTTING CONDITIONS BECAUSE CUTTING DEPTH CAN NO LONGER BE INCREASED |

MACHINE TOOL WITH FUNCTION TO AUTOMATICALLY MODIFY CUTTING CONDITIONS

RELATED APPLICATIONS

The present application claims priority to Japanese Application Number 2015-015024, filed Jan. 29, 2015, the disclosure of which is hereby incorporated by reference herein in its entirety.

BACKGROUND OF THE INVENTION

1. Field of the Invention

The present invention relates to a machine tool, and particularly to a machine tool with a function to automatically modify cutting conditions.

2. Description of the Related Art

In executing a cutting process on a workpiece using a machine tool, in some cases the tool rotational speed and cutting feed speed stored in a machining program need to be corrected in order to modify the cutting conditions according to the situation. In a complicated machining program, however, the tool rotational speeds and cutting feed speeds are usually designated individually in a large number of locations, and it is extremely troublesome to correct all the cutting conditions manually. It is also extremely difficult to determine whether the modified cutting conditions are appropriate or not or whether the cutting conditions including the cutting load are within an appropriate range or not. Japanese Patent Application Laid-Open No. 2000-084794 and Japanese Patent Application Laid-Open No. 2007-94458 disclose techniques for automatically modifying the cutting conditions.

The technique disclosed in Japanese Patent Application Laid-Open No. 2000-084794 aims to automatically modify the cutting conditions to optimum cutting conditions but does not take into consideration intentional automatic modification of the cutting conditions within an appropriate range. This technique, therefore, is not capable of responding to requests such as "wishing to lower the current cutting conditions a little bit more to increase the life of the tool, although the current cutting conditions are not particularly problematic."

The technique disclosed in Japanese Patent Application Laid-Open No. 2007-94458, on the other hand, is capable of solving the problem described above, but cannot determine whether the modified cutting conditions are appropriate or not. Moreover, this technique merely takes the cutting feed speeds into consideration and is not capable of modifying the cutting conditions in response to the rotational speed of the spindle or the actual cutting load.

The conditions upon cutting, such as the number of tool revolutions and the cutting feed speeds, are usually designated specifically within the machining program and therefore can be modified relatively easily both manually and automatically. The cutting widths and cutting depths, on the other hand, are usually not designated specifically in the machining program. Therefore, in order to modify these cutting conditions, the machining program needs to be corrected by manually inputting the cutting conditions, while comparing the shape of the machined object with the machining program, bringing about a problem that modifying these cutting conditions cannot be performed easily.

SUMMARY OF THE INVENTION

An object of the present invention is to provide a machine tool that has a function to automatically modify the cutting conditions.

A machine tool according to the present invention is a machine tool for machining a workpiece according to a machining program, the machine tool having: a tool cutting condition setting unit for setting upper limits and lower limits for cutting conditions including a cutting width, a cutting depth, and a cutting load of a tool used for machining; a modification condition setting unit for setting a range and a modification condition of the machining program modifying at least one of the cutting width and the cutting depth of the tool; a first movement amount modification unit for modifying, based on the modification condition, a movement amount of a block that orders a feeding operation of the machining program; a load calculation unit for calculating a load imposed upon cutting, based on a cutting condition obtained prior to modification of the machining program and a variation in the modified movement amount; and a determination unit for determining whether or not the modified movement amount and the calculated cutting load fall within ranges between the upper limits and the lower limits of the cutting width or cutting depth and the cutting load, the ranges being set by the tool cutting condition setting unit.

The machine tool can also have a display unit for displaying a result of determination made by the determination unit.

When it is determined by the determination unit that the modified cutting width or cutting depth and the calculated cutting load fall within the ranges between the upper limits and the lower limits of the cutting width or cutting depth and the cutting load, the ranges being set by the tool cutting condition setting unit, the machine tool may execute the machining program.

The machine tool may also have a second movement amount modification unit for modifying, based on the determination unit, the movement amount of the block that orders the feed operation of the machining program so as to fall within the ranges between the upper limits and the lower limits of the cutting width or cutting depth and the cutting load, the ranges being set by the tool cutting condition setting unit, and the machine tool may execute the machining program according to a result of the modification performed by the second movement amount modification unit.

According to the present invention, an operator or production line manager can increase the life of a cutting tool by lowering the load imposed on the cutting tool by lowering the cutting conditions within an appropriate range, when the cylcle time expansion is acceptable. Also when there is some room for raising the cutting conditions, the operator or production line manager can also reduce the cycle time by raising the cutting conditions within an appropriate range. The operator or production line manager can perform such flexible modification on the cutting conditions. In addition, in order to modify the cutting conditions as described above, a simple method can be taken to keep the modified cutting conditions within an appropriate range while meticulously adjusting the machining program.

BRIEF DESCRIPTION OF THE DRAWINGS

The above and other objects and features of the present invention will become apparent from the following description of an embodiment made with reference to the accompanying drawings.

FIG. 1 is a diagram showing a procedure for realizing a function to automatically modify a cutting condition according to an embodiment of the present invention;

FIG. 3 is a diagram showing condition setting example 1 of the automatic modification function according to the embodiment of the present invention;

FIG. 4 is a diagram showing condition setting example 2 of the automatic modification function according to the embodiment of the present invention;

FIG. 5 shows an example showing a machining program including simple blocks;

FIG. 11 shows procedure 1 of a cutting depth automatic modification process that is executed on a machine tool according to the embodiment of the present invention;

FIG. 12 shows procedure 2 of the cutting depth automatic modification process that is executed on the machine tool according to the embodiment of the present invention;

DESCRIPTION OF THE PREFERRED EMBODIMENT

An embodiment of the present invention is described hereinafter along with the drawings. A method for modifying a cutting condition according to the present invention is described first.

According to the present invention, a machine tool has a function to automatically modify the cutting conditions by executing the steps shown in FIG. 1. Within the cutting condition range that is set in step 2 shown in the diagram, an operator or production line manager changes the cutting conditions up and down in step 3, depending on his/her request, and thereby the machine tool automatically modifies the cutting conditions and executes cutting with respect to the settings of the current machining program in step 5.

Each of the steps shown in FIG. 1 is described with the following detailed examples.

<Step 1: Considering Whether Cutting Conditions can be Modified or not>

The operator or production line manager determines whether to modify the cutting conditions with respect to the current machining program.

<Step 2: Entering Upper and Lower Limits of Cutting Conditions of Each Tool>

The operator or production line manager enters upper and lower limits of the cutting conditions of each tool used for cutting a workpiece. The machine tool needs to have means for entering these values and means for storing the entered values.

Figures 2A, 2B:
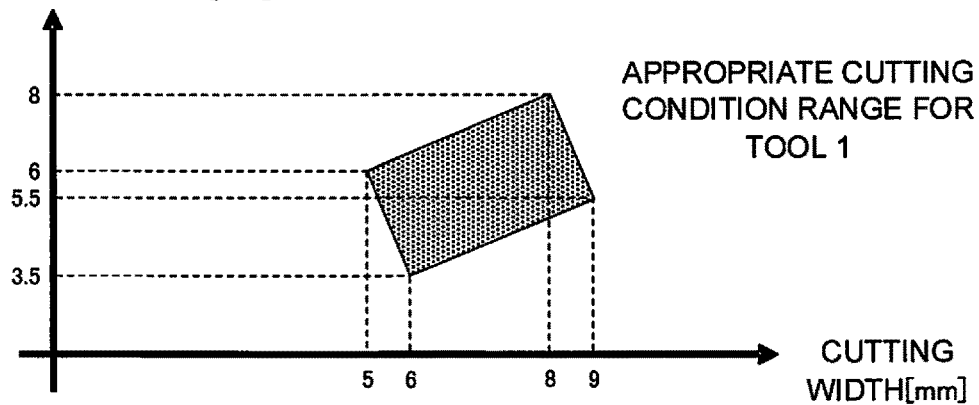
FIGS. 2A and 2B are diagrams each showing an example of upper and lower limits for a cutting condition of each tool, according to the embodiment of the present invention.

The entering means may be means for manually or automatically entering, for example, the content shown in FIG. 2A or means for graphically displaying or designating a cutting condition range shown in FIG. 2B by using a polygon.

These conditions may be entered manually. Alternatively, for the purpose of entering these conditions, the machine tool may be provided with a database and means for automatically entering a cutting condition range when a model number or control number of a tool is designated.

Moreover, the upper limits and lower limits for each tool might vary depending on the material to cut and the machining type (rough machining or finish machining). For this reason, a plurality of combinations of upper and lower limits may be set for each tool in advance, to enable selection of an appropriate combination from these combinations when executing machining, so that these values can be modified depending on the material.

An upper or lower limit is set for the load imposed upon cutting as well, in addition to the cutting width and cutting depth. Although it is not a problem that only the upper limit is set for the load imposed upon cutting, a significant decrease of the load imposed upon cutting is expected when the tool is completely damaged or falls off and no longer comes into contact with the machined object. Therefore, setting the lower limit as well allows the operator or production line manager to assume, for example, such complete damage or falling of the tool to some extent.

As to the calculation of the load imposed upon cutting, the following calculation methods, for example, can be considered.

Load Calculation Method 1: Automatic Calculation Based on Variations in Cutting Width and Cutting Depth Increases in the cutting width and cutting depth at the time of cutting lead to an increase in the cutting load. The cutting load is generally proportional to the cutting cross-sectional area, that is, "cutting width×cutting depth." Therefore, a variation in the cutting load can be estimated through calculation of variations in the cutting width and the cutting depth.

Load Calculation Method 2: Changes in Current Flowing to Spindle Motor and Feed Axis Motor Upon Cutting Generally, when a cutting condition is increased or the tool/cutter is chipped and worn, the power required for cutting the workpiece tends to increase at the time of both rotation of the tool and the axis feeding. The current flowing to the tool rotation motor and feed axis motor increases to generate force required for cutting the workpiece.

Therefore, for example, "a motor rated current" or "a motor current applied when cutting the workpiece with a tool that is not chipped" is stored beforehand as a reference value, and it is determined, based on this reference value, how much the current applied upon cutting is changed, to estimate the load imposed upon cutting. When the current applied upon cutting is greater than the reference value, it means that the load is high. When, on the other hand, the current applied upon cutting is lower than the reference value, it means that the load is low.

Note that a current sensor may be provided to measure a motor current value, or the motor current value may be read through a communication with a spindle motor controller or a feed axis motor controller. In a typical machine tool, the latter can be performed without an additional device and is therefore considered desirable.

Load Calculation Method 3: Changes in Power Consumption of Spindle Motor and Feed Axis Motor Upon Cutting This method is roughly the same as the "load calculation method 2" described above, except that power consumption is employed in place of the motor current. For instance, "motor rated power consumption" or "power consumed when cutting the workpiece with a tool that is not chipped" is stored beforehand as a reference value, and it is determined, based on this reference value, how much the power consumption upon cutting is changed, to estimate the load imposed upon cutting. The method for measuring the power consumption also conforms to the "load calculation method 2."

Load Calculation Method 4: Changes in Sound Pressure Level and Frequency Characteristics of Sound Generated Upon Cutting Generally, when a cutting condition is raised or the tool/cutter is chipped and worn, the pressure level of a sound generated upon machining increases as the load increases. Consequently, the frequency characteristics are likely to change as well.

For example, "the volume and frequency characteristics of a sound that is generated when cutting the workpiece with a tool that is not chipped/worn" are stored beforehand as reference values, and the reference values are compared with the sound pressure level or frequency characteristics upon cutting, to estimate the load imposed upon cutting. Although the load imposed upon cutting may be estimated only with a change in the sound pressure level, investigating a change in the frequency characteristics along with a change in the sound level pressure enables estimation of the presence of some sort of a change factor in cutting, when "the sound pressure level is not changed but the frequency characteristics are."

Installing a microphone or the like can be considered as the method for measuring the sound level pressure and frequency characteristics. In addition, the controller needs to be provided with processing means for executing computation, storage, and comparison involved in analyzing the sound pressure level and frequency characteristics of the sound.

Load Calculation Method 5: Changes in Level and Frequency Characteristics of Machine Vibration Generated Upon Cutting A machine vibration is employed in place of the sound used in the "load calculation method 4." In other words, for example, "the level and frequency characteristics of a vibration of the machine that is generated when cutting the workpiece with a tool that is not chipped/worn" are stored beforehand as reference values, and the reference values are compared with the level or frequency characteristics of the machine vibration generated upon cutting. It is preferred that the frequency characteristics be used as an auxiliary guide to make a determination and that changes in the level of the vibration be mainly used to make a determination. A vibrometer and the like are considered as the method for measuring the frequency characteristics.

The results of the foregoing "load calculation method 4" and "load calculation method 5" are considered to fluctuate due to the elements other than the machining conditions. Therefore, instead of using the "load calculation method 4" or "load calculation method 5" alone, it is preferred that the "load calculation method 4" or "load calculation method 5" be used in combination with any of the "load calculation method 1" to "load calculation method 3."

Note that the "load calculation method 1" can determine whether the machining load is within an appropriate range or not prior to the executing of cutting. Although test machining is not necessary when this method is used, test machining needs to be performed when any of the "load calculation method 2" to "load calculation method 5" is used, for practical reasons.

Five load calculation methods have been described above, but the method for calculating the load is not limited thereto; thus, other methods can be employed.

<Step 3: Setting Conditions for Automatically Modifying Cutting Conditions>

The operator or production line manager considers how to automatically modify the cutting conditions that are set in the current machining program, and then sets the conditions for the automatic modification function. The machine tool has entering means and storage means for entering and storing these settings. FIGS. 3 and 4 each show an example of the settings.

As shown in FIGS. 3 and 4, the conditions for the cutting condition automatic modification function according to the present invention has three setting items: "application range setting," "cutting width," and "cutting depth."

A machining program range for applying the conditions is designated for the setting item, "application range setting." For example, "applying to the entire machining program," "applying only to a designated range of the machining program," and "not applying" are now explained as the values to be set for "application range setting."

Figure 6:
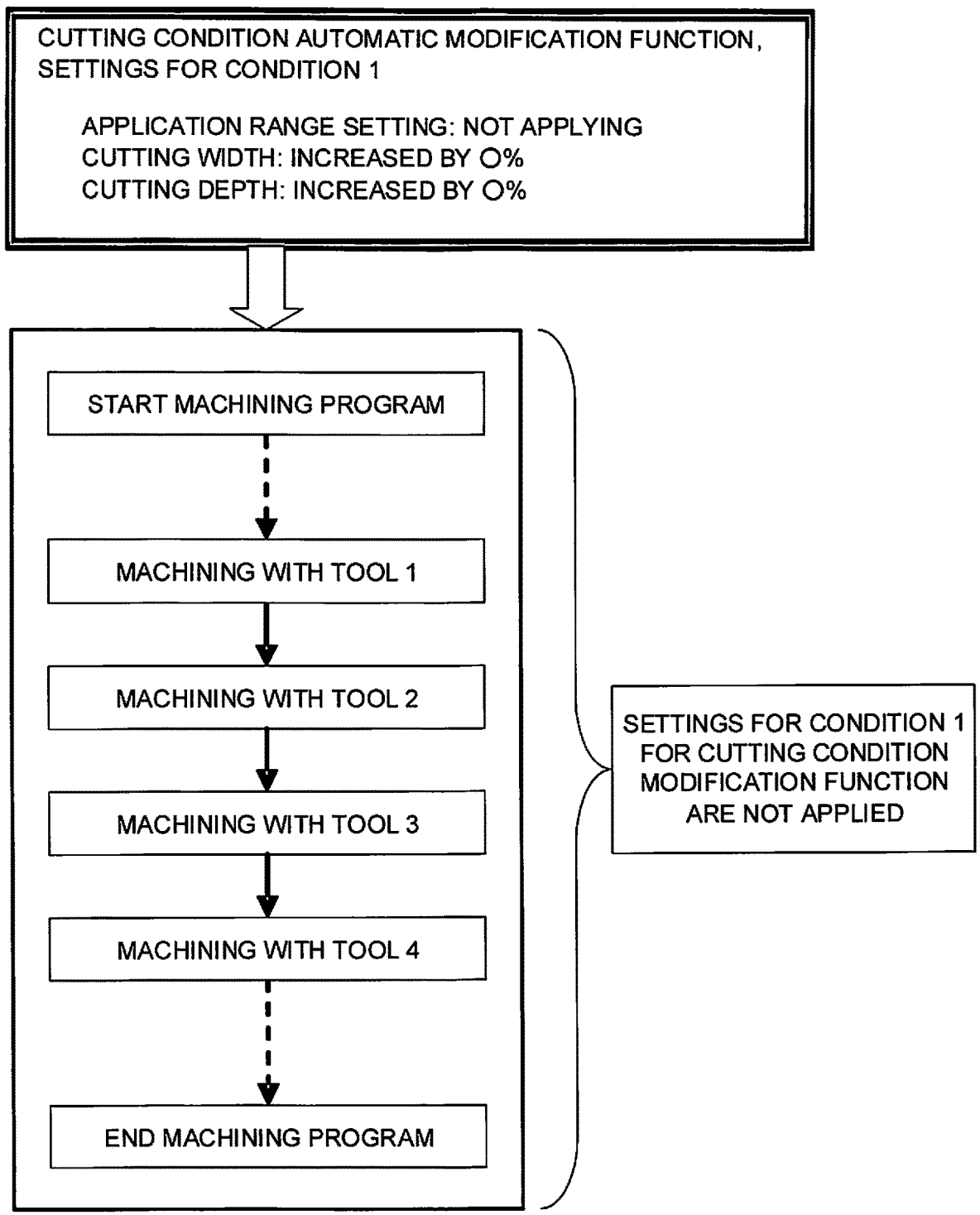
FIG. 6 shows a setting example in which automatic modification of a cutting condition is not performed in the machining program of the present invention.

For instance, a machining program with a simple block shown in FIG. 5 is described. When setting "3) not applying" for the setting item, "application range setting," modifications are not applied even when the modification conditions are set for the setting items, "cutting width" and "cutting depth," as shown in FIG. 6.

Figure 7:
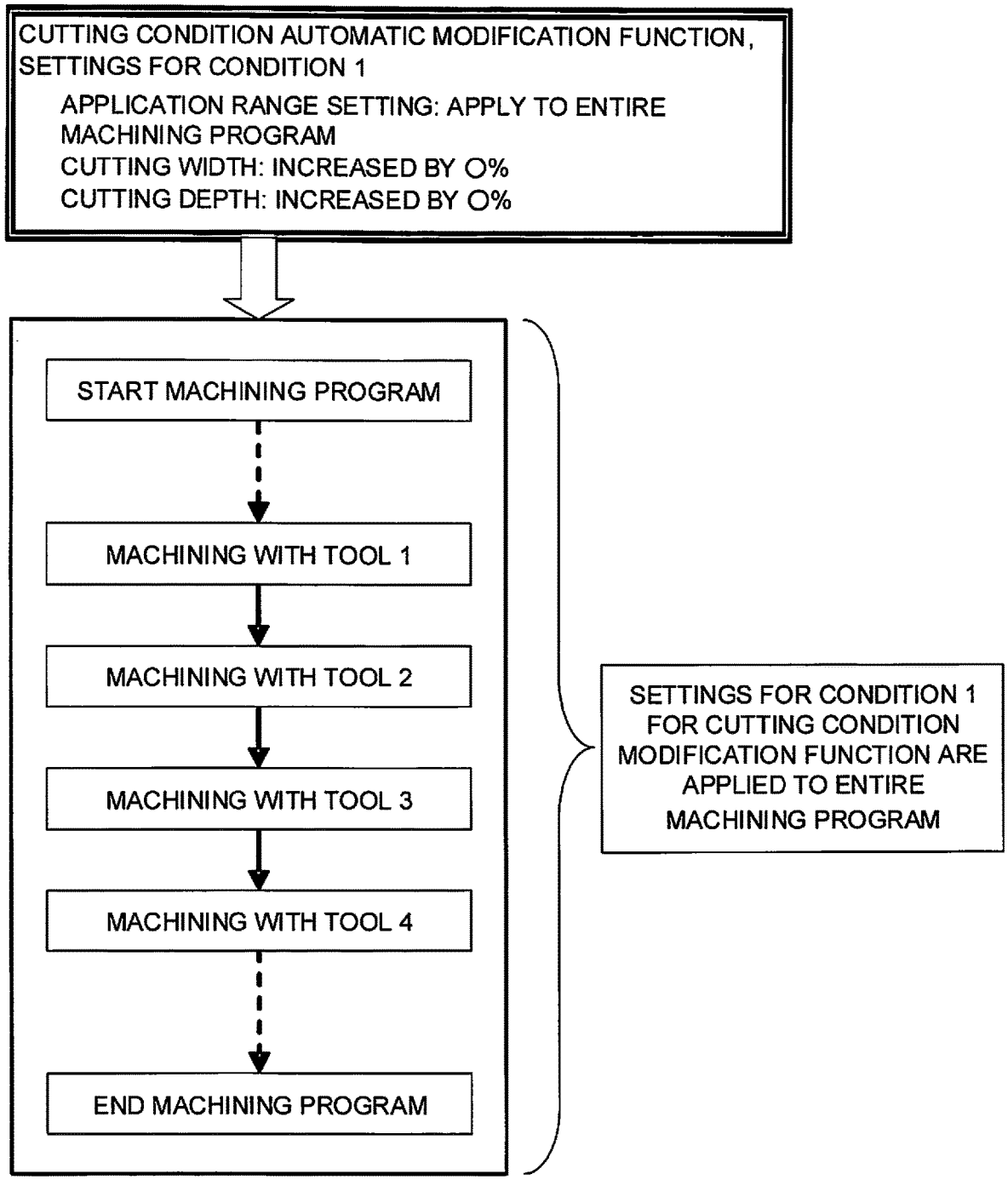
FIG. 7 shows a setting example in which automatic modification of a cutting condition is performed in the entire machining program of the present invention.

On the other hand, when "1) applying to the entire machining program" is selected as the setting item, "application range setting," the modification conditions for the cutting width and cutting depth are applied to the entire machining program, as shown in FIG. 7.

Figure 8:
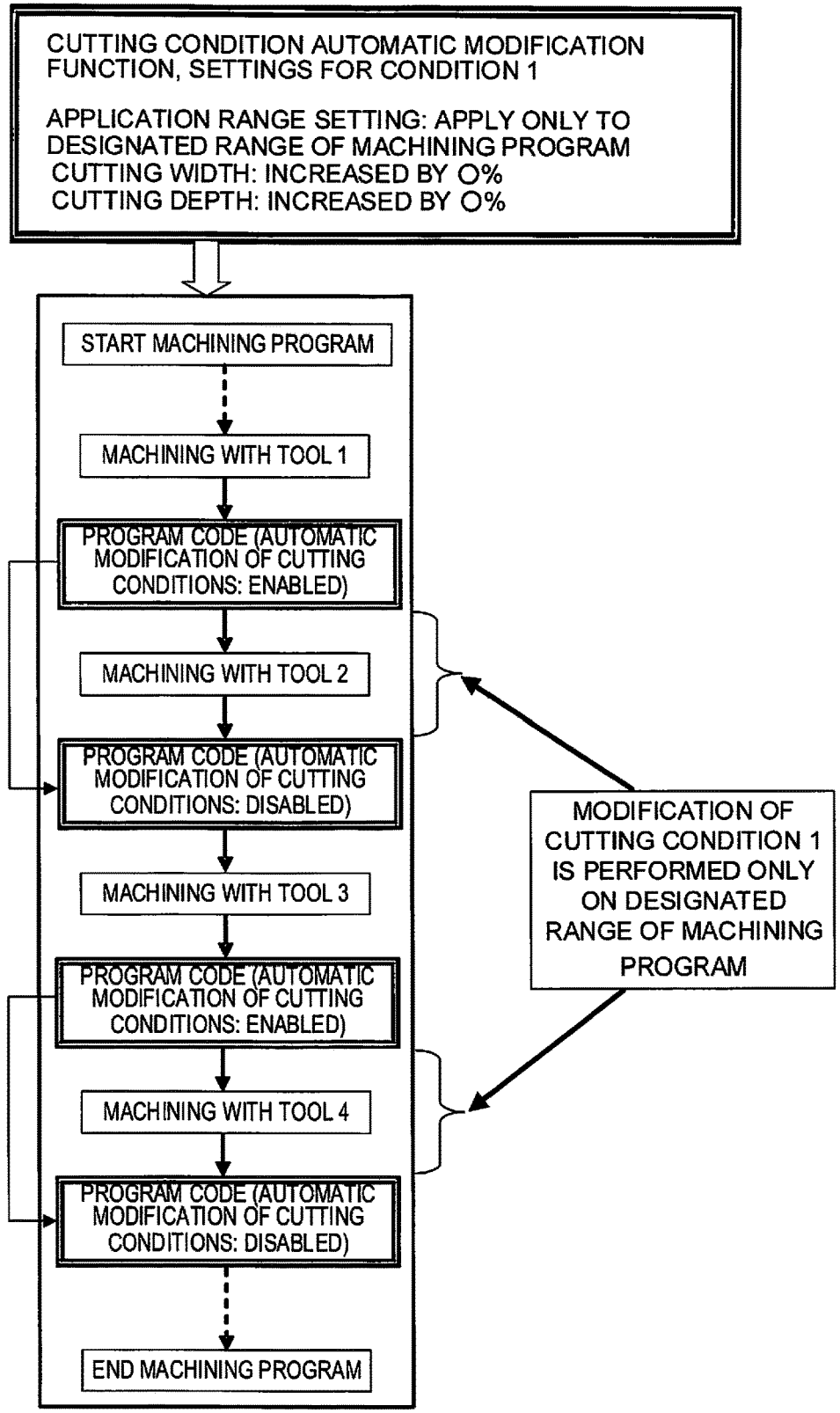
FIG. 8 shows setting example 1 in which automatic modification of a cutting condition is performed in designated sections of the machining program of the present invention.

When "2) applying only to a designated range of the machining program" is selected as the setting item, "application range setting," a program code or the like for designating a range in the machining program is added or means for designating a range of application separately is provided, as shown in FIG. 8, so that the modification conditions such as the number of tool revolutions and cutting feed speed are applied only to the designated range by this designating means or the like.

Figure 9:
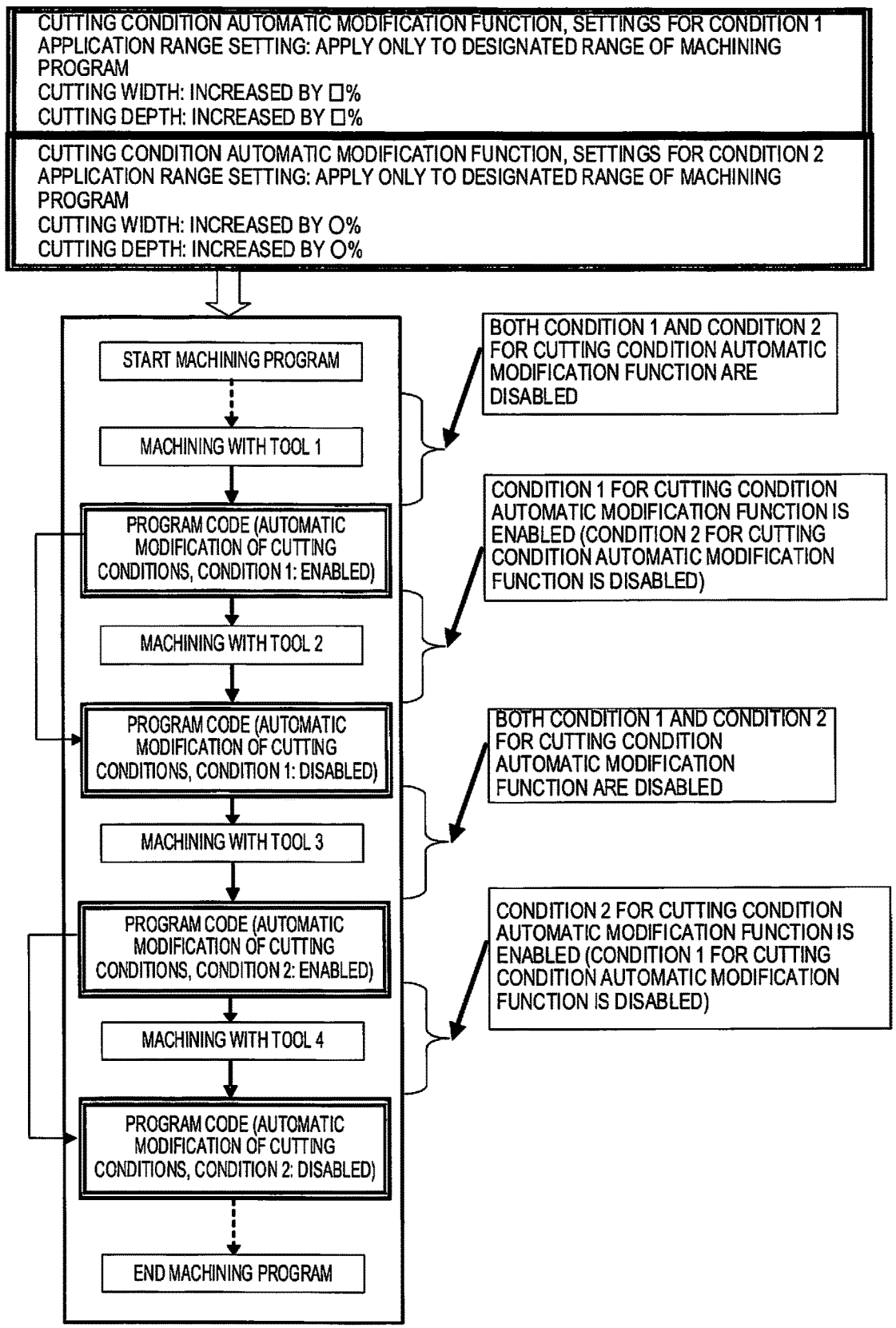
FIG. 9 shows setting example 2 in which automatic modification of a cutting condition is performed in designated sections of the machining program of the present invention.
Figure 10:
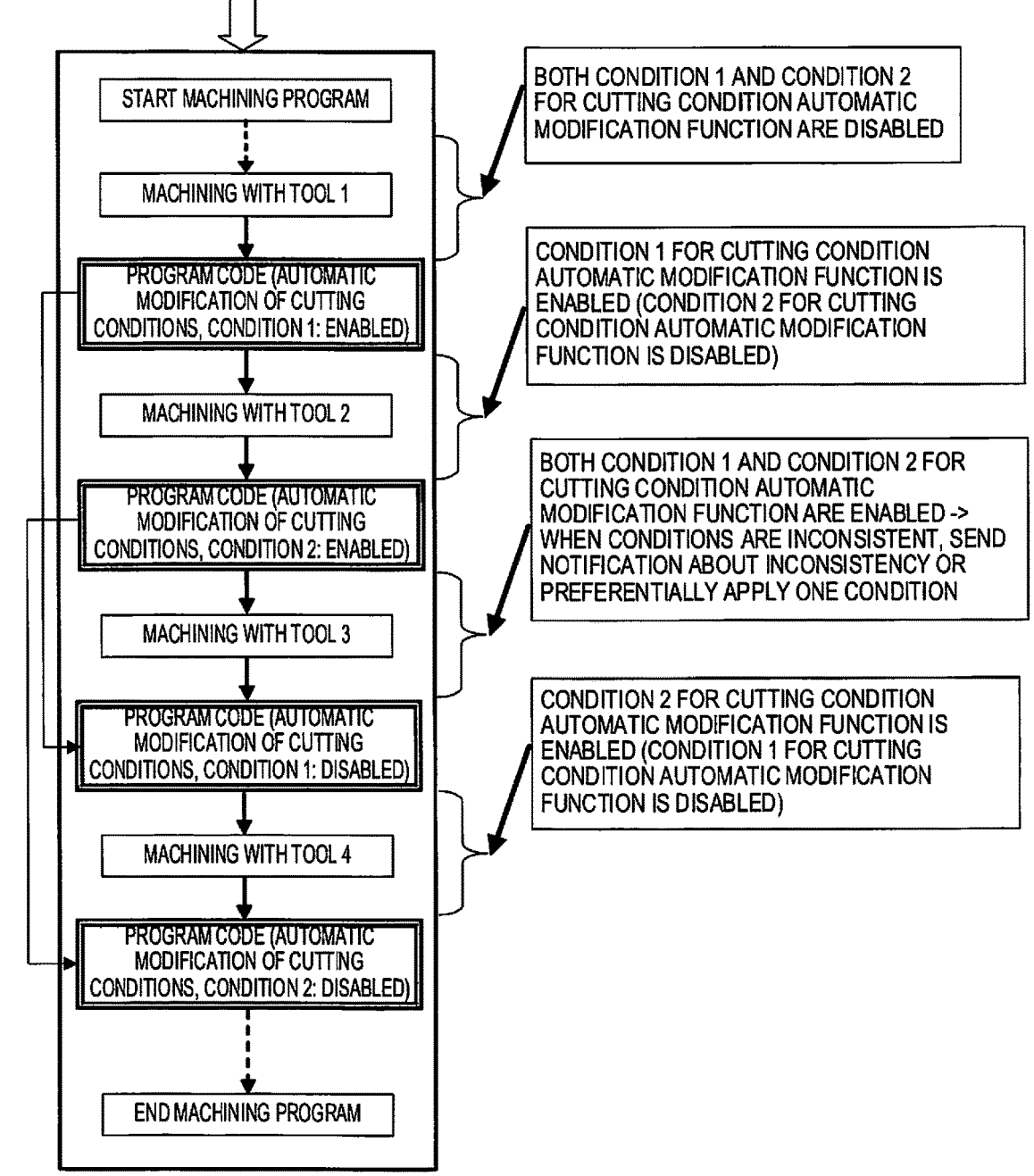
FIG. 10 shows setting example 3 in which automatic modification of a cutting condition is performed in designated sections of the machining program of the present invention.

Setting a plurality of conditions and a range of application of each of these conditions enables complicated modification of a cutting condition, as shown in FIGS. 9 and 10. However, in a case where some of the plurality of conditions to be set overlap with each other or are inconsistent, means for notifying the operator of such overlap or inconsistency or a function to preferentially apply one condition is preferably provided in the machine tool. In some cases, means capable of determining which process to execute may be provided.

FIGS. 8 to 10 each show an example of modifying a cutting condition with respect to each tool, wherein, even when the same tool is used for machining, whether to apply modifications to the cutting conditions and the details of the conditions to be modified can be changed by modifying the position for entering a program code. Therefore, the following actions, for example, can be executed:

i) When the same tool is used on two different directions or positions, the cutting conditions only for machining in the second direction or position are modified; and ii) When executing rough machining and finish machining with the same tool, cutting is executed in the rough machining under the modified cutting conditions of the first machining program, and cutting is executed in the finish machining under the cutting conditions of the original machining program.

In the application examples shown in FIGS. 6 to 10 and all the other circumstances, when the modified cutting conditions fall out of the appropriate cutting condition range, it is preferred that the machine tool have any of the following functions:

a) Stopping the machining program temporarily and then sending the information on this temporary stop;

b) Discontinuing modification of the machining conditions, and executing cutting under the conditions designated in the original machining program; and c) Automatically correcting the cutting conditions to fall within an appropriate range, and executing cutting.

In some cases, the machine tool may be provided with means capable of determining which one of the processes a) to c) should be executed.

When executing c), automatic correction is performed by, for example, the following procedure.

Case 1: When at least one of the cutting width and the cutting depth exceeds the appropriate range ⇒ automatically correct it to the maximum value of the appropriate range. However, whether or not the cutting load falls within the appropriate range prior to the execution of actual cutting is rechecked automatically.

Case 2: When at least one of the cutting width and the cutting depth is less than the appropriate range ⇒ automatically correct it to the minimum value of the appropriate range. However, whether or not the cutting load falls within the appropriate range prior to the execution of actual cutting is rechecked automatically.

Case 3: When the cutting load exceeds the appropriate range ⇒ automatically reduce either one, or both, of the cutting width and the cutting depth. Whether or not the corrected value falls within the appropriate range is rechecked automatically.

Case 4: When the cutting load is less than the appropriate range ⇒ automatically increase either one, or both, of the cutting width and the cutting depth. Whether or not the corrected value falls within the appropriate range is rechecked automatically.

This procedure for setting the conditions for automatically modifying the cutting conditions is similar to the foregoing step 2 in that the entry form, entered content and entry means corresponding to the set value for each setting item are not particularly limited and that various methods can be used to enter the set values using a keyboard or a GUI such as a mouse or touch panel.

<Step 4: Activation of Machining Program>

The machine tool activates the machining program in response to an execution process performed by the operator or production line manager or an input signal from the outside of the machine tool. However, when the machine tool is equipped with the function presented in step 3, i.e., the function to "notify the operator of the fact that some of the conditions overlap with each other or are inconsistent" or "notify the operator of the fact that the machining program is stopped temporarily when the modified cutting conditions fall out of the appropriate cutting condition range," such notifications may be sent prior to activating the machining program.

<Step 5: Applying Modifications of Cutting Conditions to Machining Program in Execution, Based on Settings>

Based on the defined conditions, the machine tool applies modifications of the cutting conditions to the original machining program and executes cutting. Unlike the cutting conditions such as the spindle speed and cutting feed speed, the cutting width and the cutting depth to be modified in the present proposal are not necessarily designated directly within the machining program. When modifying the cutting width or cutting depth, the tool path is modified from the original machining program.

For instance, in order to automatically modify the cutting depth, an automatic process is executed by the procedures shown in FIGS. 11 and 12.

Note in FIGS. 11 and 12 that the final machining operation ends up taking on the burden of the repetition of machining operations. Modifying the cutting conditions, on the other hand, affects the machined surface. Therefore, the present invention may take on a configuration in which a machining operation other than the final machining operation takes on the burden of the repetition of machining operations.

When setting the upper limits and the lower limits for the cutting conditions, in some cases the cutting conditions might not fall between the upper limits and the lower limits due to the machining processes taking on the burden of the repetition described above. In such a case, executing the machining operations by, for example, the following processes is considered in addition to discontinuing the application of the cutting conditions.

The operations of the machine tool according to the present embodiment are described hereinafter based on more specific examples.

In machining a workpiece with the machine tool of the present embodiment, an example is considered in which the cutting depth is modified to 2 mm from the machining program that has the lower limit of the cutting depth of a tool set at 1.5 mm and machines the workpiece three times into a depth of 9 mm (a cutting depth of 3 mm per machining operation).

The calculation process ends up with a cutting depth of 2 mm from the first to the fourth machining operations and a cutting depth of 1 mm in the fifth machining operation, where the cutting depth of the tool in the fifth machining operation falls below the lower limit of 1.5 mm.

In this case, the cutting depth is modified as follows, for example. Note that the set cutting depths are greater than the lower limit (1.5 mm) and adhered to as much as possible.

Cutting depth in the first to the third machining operations: 2 mm

Cutting depth in the fourth and the fifth machining operations: 1.5 mm

Total cutting depth: 2×3+1.5×2=9 [mm]

Figure 13:
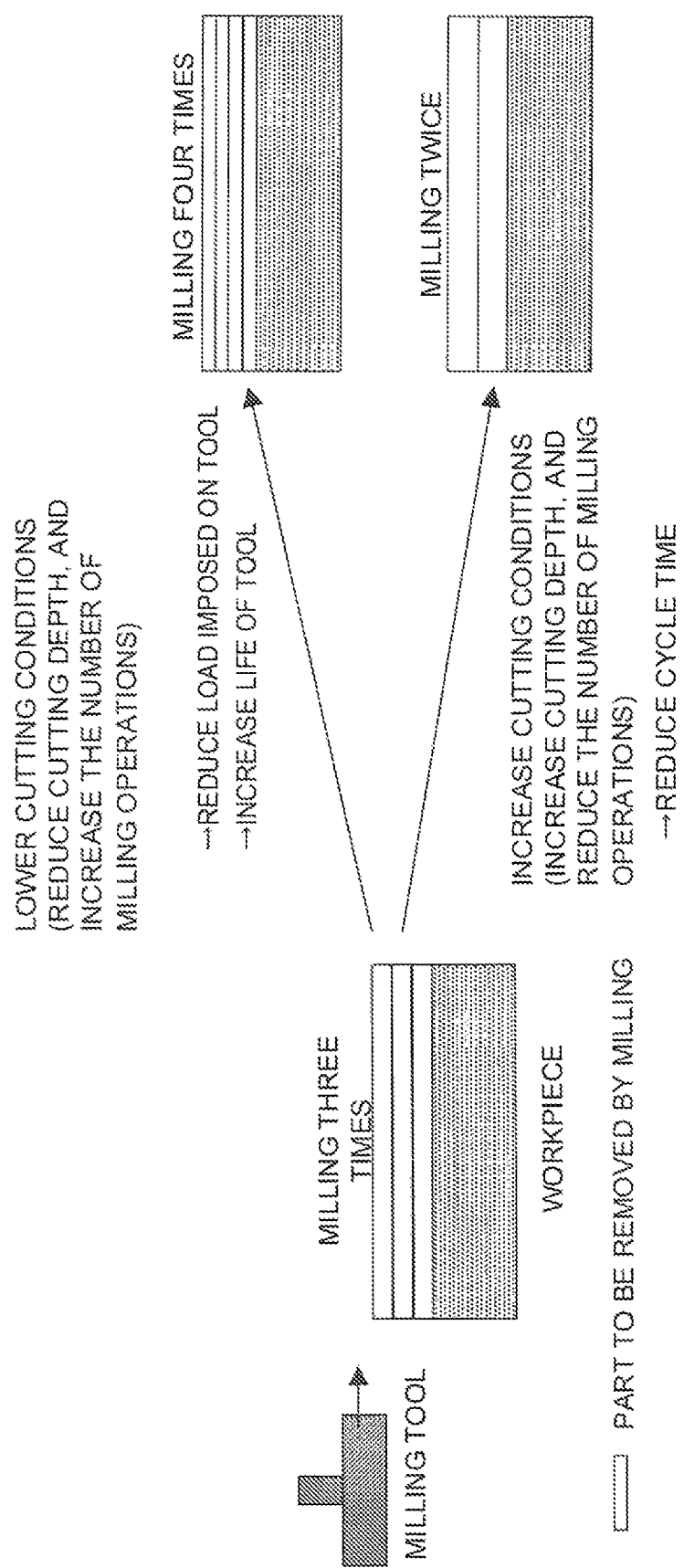
FIG. 13 shows an example of applying the present invention to milling.

The automatic processes shown in FIGS. 11 and 12 realize the application example shown in FIG. 13 in, for example, milling.

On the other hand, the same effects can be realized as to the cutting width by searching/extracting and modifying "the position where fast-forwarding the tool toward the workpiece in the direction perpendicular to the direction of the rotation axis of the tool is instructed," instead of "the position where fast-forwarding the tool toward the workpiece in the direction of the rotation axis of the tool is instructed" shown in FIGS. 11 and 12.

The following three case examples are possible as the examples shown in FIG. 11 or 12. No particular restrictions are imposed in the present proposal. A plurality of optional methods may be provided depending on the situation so that the method that meets the requirements of the operator/production line manager can be executed.

Case Example 1

Modifying the Original Machining Program in Response to Changes of Cutting Conditions The controller of the machine tool executes this process in, for example, the following order:

(1) Read the content/transfer path of the machining program by the internal processing of the controller;

(2) Calculate the transfer path complying with the automatic modification settings for the cutting conditions (the transfer path, of course, is different from the transfer path of the original machining program) through the internal processing of the controller;

(3) Correct the original machining program to obtain the path calculated in (2); and (4) Execute the actual operation according to the machining program corrected in (3).

In a case where the method of this case example is employed or where the same machining needs to be executed with another machine (i.e., machining under the modified cutting conditions), only the original machining program may be implanted.

Case Example 2

Creating Modified Version of Machining Program that Reflects Changes of Cutting Conditions, without Modifying Original Machining Program, and Executing Modified Version of Machining Program The controller of the machine tool executes this process in, for example, the following order:

(1) Read the content/tool path of the machining program by the internal processing of the controller;

(2) Calculate and store the transfer path complying with the automatic modification settings for the cutting conditions (the tool path, of course, is different from the tool path of the original machining program) through the internal processing of the controller;

(3) Create a machining program having a corrected path from the original machining program, to obtain the path calculated in (2); and (4) Execute the actual operation according to the machining program corrected in (3).

In a case where the method of this case example is employed or where the same machining needs to be executed with another machine (machining under the modified cutting conditions), only the modified version of machining program may be implanted.

Case Example 3

Installing Means for Separately Storing/Processing Changes of Cutting Conditions without Modifying Original Machining Program The controller of the machine tool executes this process in, for example, the following order:

(1) Read the content/tool path of the machining program by the internal processing of the controller;

(2) Calculate and store the tool path complying with the automatic modification settings for the cutting conditions (the tool path path, of course, is different from the tool path of the original machining program) through the internal processing of the controller; and (3) Execute the actual operation according to the tool path calculated in (2).

In a case where the method of this case example is employed or where the same machining needs to be executed with another machine (machining under the modified cutting conditions), both the original machining program and the details of the modification conditions need to be implanted.

As to setting the range of applying modifications of the machining conditions described above, the same methods as the ones described in the case examples above can be employed. Although FIGS. 8 to 10 each show an example of adding a program code to the original machining program (i.e., an example of adding changes to the original machining program), "means for creating a modified version of machining program that reflects the changes of the cutting conditions, without changing the original machining program, and executing the modified version of machining program" as with the case example 2 or "means for separately storing/processing the settings of the range of application of modification of conditions without modifying the original machining program" as with the case example 3 may be provided.

<Step 6: Stopping Machining Program>

The machine tool ends and stops the machining program using a command code of the machining program. Depending on the command code of the machining program, a process may automatically be shifted to a process of cutting the next part.

Figure 14:
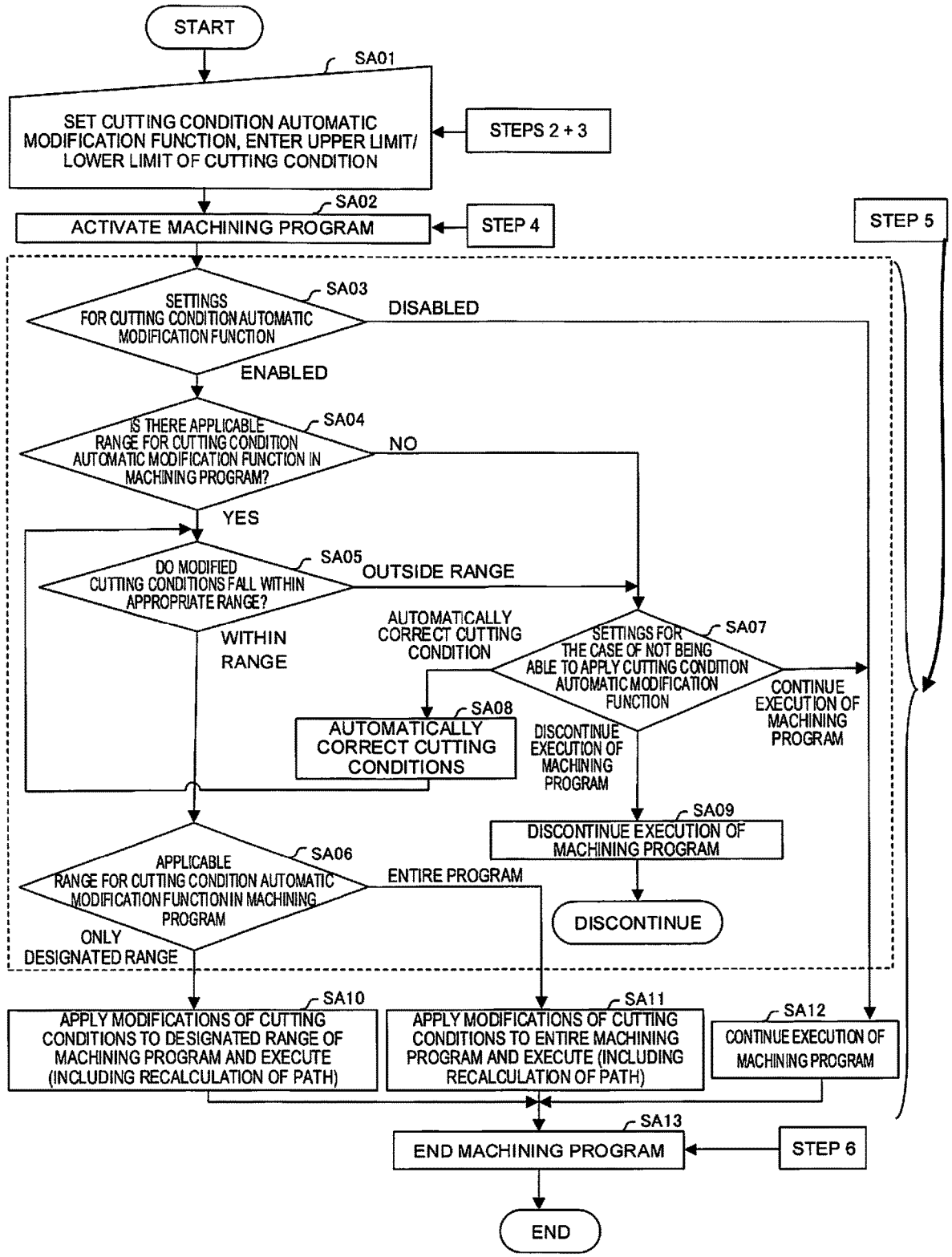
FIG. 14 is a flowchart of a process executed on the machine tool of the present invention.

FIG. 14 is a flowchart showing the overview of steps 2 to 6. The process according to the present embodiment is not limited to the flowchart shown in FIG. 14. Especially the sections surrounded with the dotted line (steps SA03 to SA09) may be executed prior to the activation of the machining program.

[Step SA01] Receive the upper limits/lower limits of the cutting conditions and the set values for the cutting condition automatic modification function from the operator or production line manager, and store these values in a storage area provided in storage means such as a memory.

[Step SA02] Receive a command from the operator, the production line manager, or an external device, and activate the machining program.

[Step SA03] Determine whether the settings of the cutting condition automatic modification function are enabled or not. If enabled, the process proceeds to step SA04, and if not, the process proceeds to step SA12.

[Step SA04] Determine whether there exists, in the machining program, the range in which the cutting condition automatic modification function can be applied. If the range exists, the process proceeds to step SA05, and if not, the process proceeds to step SA07.

[Step SA05] Modify the cutting conditions according to the settings of the cutting condition automatic modification function, and determine whether the modified cutting conditions fall within the appropriate range or not. If the modified cutting conditions fall within the appropriate range, the process proceeds to step SA06, and if not, the process proceeds to step SA07.

[Step SA06] Determine the range for automatically applying changes of the cutting conditions of the machining program. If the range is merely a designated range, the process proceeds to step SA10, but if the range is applied to the entire machining program, then the process proceeds to step SA11.

[Step SA07] Determine the operation settings for the case of not being able to apply the cutting condition automatic modification function. If the operation settings are set to automatically correct the cutting conditions, the process proceeds to step SA08. If the operation settings are set to discontinue the execution of the machining program, the process proceeds to step SA09. If the operation settings are set to continue the execution of the machining program, the process proceeds to step SA12.

[Step SA08] Automatically correct the cutting conditions to fall within an appropriate range, and return to step SA05.

[Step SA09] Discontinue the execution of the machining program, and end this process.

[Step SA10] Apply changes of the cutting conditions to a designated range of the machining program, and then execute the machining program. Recalculate the machining path when executing the machining program.

[Step SA11] Apply changes of the cutting conditions to the entire machining program, and then execute the machining program. Recalculate the machining path when executing the machining program.

[Step SA12] Execute the machining program without modifying the machining program.

[Step SA13] End the execution of the machining program once the machining program is executed completely, and end this process.

The minimum components required in the present invention are described hereinafter.

Component a: A machine tool main body equipped with a display unit and a controller that can be operated automatically by a machining program.

Component b: A function to enter one or more ranges of appropriate cutting widths and cutting depths (hereinafter referred to as cutting conditions) of each tool installed in the machine tool.

Component c: A function to enter an acceptable range of a cutting load together with the ranges of the cutting conditions described in the component b.

Component d: A function to store the ranges described in the components b and c.

Component e: A function to enter one or more condition settings for automatically modifying the cutting conditions designated beforehand in the machining program.

Component f: A function to store the conditions settings described in the component e.

Component g: A function to calculate the cutting load based on one or more of the followings.
  Automatic calculation based on variations in the cutting width and the cutting depth.
  Changes in current flowing to the tool rotation motor (or spindle motor) and the feed axis motor.
  Changes in power consumption of the tool rotation motor (or spindle motor) and feed axis motor.
  Changes in sound pressure level and frequency characteristics of a sound generated upon cutting.
  Changes in level and frequency characteristics of a machine vibration generated upon cutting.

Component h: A function to automatically apply the change settings of the cutting conditions of the component e to the machining program.

Component i: A function to determine whether the changes of the cutting conditions applied by the component h and the load calculated by the component g fall within the ranges of the component b and component c.

Component j: A function to execute the machining program according to the changes of the cutting conditions applied by the component h, if the result obtained by the component i has no problem.

The present invention may have the following components in addition to the foregoing components.

Component k: A function to graphically enter and display the ranges of the cutting conditions using the component b and component c.

Component l: A function to enter a cutting condition range of each tool beforehand based on a pre-installed database by using the component b and component c, and automatically set a cutting condition range based on the model number or control number of each tool that is entered.

Component m: A function to apply the condition settings entered by the component e to a random range within the machining program.

Component n: A function to determine whether there is an inconsistency between the conditions, when a plurality of condition settings entered by the component e are applied simultaneously to the machining program.

Component o: A function to discontinue the application of the cutting conditions and the execution of the machining program when there is an inconsistency between the conditions as a result of the determination made by the component n, and notify the operator or production line manager of such inconsistency and/or discontinuation.

Component p: A function to apply only a highest priority condition out of the plurality of conditions, when there is an inconsistency between the conditions as a result of the determination made by the component n.

Component q: A function to discontinue the application of the cutting conditions and the execution of the machining program when there is a problem in the determination made by the component i, and notify the operator or production line manager of such problem and/or discontinuation.

Component r: A function to discontinue the application of the cutting conditions when there is a problem in the determination made by the component i, and execute the machining program under the cutting conditions designated by the original machining program.

Component s: A function to automatically correct the cutting conditions to fall within an appropriate cutting condition range when there is a problem in the determination made by the component i, and execute the machining program under the corrected conditions.

Component t: A function to disable setting of any input items to prevent incorrect entry by the component e.

Component u: A function to enable entry by the component b, component c, and component e through an external unit connected to the machine tool.

The above has described an embodiment of the present invention, but the present invention is not limited thereto and can be implemented with other embodiments by making appropriate changes.

What is claimed is:

1. A machine tool for machining a workpiece according to a machining program,
  the machine tool configured to
    receive data including
      upper limits and lower limits for cutting conditions including a cutting width, a cutting depth, and a cutting load of a tool used for machining, and
      a range of the machining program and a modification condition of the machining program for modifying at least one of the cutting width and the cutting depth of the tool, store the received data in a memory of the machine tool, automatically modify, based on the modification condition, the at least one of the cutting width and the cutting depth of the tool in the machining program, and calculate a cutting load imposed upon cutting, based on the modified at least one of the cutting width and the cutting depth, wherein the machine tool includes a controller configured to determine whether or not (i) the modified cutting width or cutting depth and (ii) the calculated cutting load fall within ranges between the received upper limits and the received lower limits of the cutting width, cutting depth and cutting load, respectively, and in response to a determination result that (i) the modified cutting width or cutting depth and (ii) the calculated cutting load fall within the ranges between the received upper limits and the received lower limits of the cutting width, cutting depth and cutting load, respectively, modify the machining program to apply the modified at least one of the cutting width and the cutting depth in accordance with the range of the machining program stored in the memory, and execute an actual operation according to the modified machining program.

2. The machine tool according to claim 1, further comprising:

a display configured to display the determination result made by the controller.

3. The machine tool according to claim 1, wherein the controller is further configured to in response to a determination result that at least one of (i) the modified cutting width or cutting depth and (ii) the calculated cutting load does not fall within the ranges between the received upper limits and the received lower limits of the cutting width, cutting depth and cutting load, respectively, correct the modified at least one of the cutting width and the cutting depth so as to fall within the ranges between the received upper limits and the received lower limits of the cutting width and cutting depth, respectively.

4. A machine tool for machining a workpiece according to a machining program, the machine tool configured to receive data including upper limits and lower limits for cutting conditions including a cutting width, a cutting depth, and a cutting load of a tool used for machining, and a range of the machining program and a modification condition of the machining program for modifying at least one of the cutting width and the cutting depth of the tool, store the received data in a memory of the machine tool, automatically modify, based on the modification condition, the at least one of the cutting width and the cutting depth of the tool in the machining program, and calculate a cutting load imposed upon cutting, based on the modified at least one of the cutting width and the cutting depth, wherein the machine tool includes a controller configured to determine whether or not (i) the modified cutting width or cutting depth and (ii) the calculated cutting load fall within ranges between the received upper limits and the received lower limits of the cutting width, cutting depth and cutting load, respectively, and in response to a determination result that (i) the modified cutting width or cutting depth and (ii) the calculated cutting load fall within the ranges between the received upper limits and the received lower limits of the cutting width, cutting depth and cutting load, respectively, without modifying the machining program, create a modified version of the machining program that reflects the modified at least one of the cutting width and the cutting depth in accordance with the range of the machining program stored in the memory, and execute an actual operation according to the created modified version of the machining program.

5. The machine tool according to claim 4, further comprising:

a display configured to display the determination result made by the controller.

6. The machine tool according to claim 4, wherein the controller is further configured to in response to a determination result that at least one of (i) the modified cutting width or cutting depth and (ii) the calculated cutting load does not fall within the ranges between the received upper limits and the received lower limits of the cutting width, cutting depth and cutting load, respectively, correct the modified at least one of the cutting width and the cutting depth so as to fall within the ranges between the received upper limits and the received lower limits of the cutting width and cutting depth, respectively.

\* \* \* \* \*